United States Patent
Wang

(10) Patent No.: US 11,154,980 B2
(45) Date of Patent: Oct. 26, 2021

(54) BRACKET APPARATUS

(71) Applicant: AUTEL INTELLIGENT TECHNOLOGY CORP., LTD., Guangdong (CN)

(72) Inventor: Xiaolong Wang, Guangdong (CN)

(73) Assignee: AUTEL INTELLIGENT TECHNOLOGY CORP., LTD., Shenzhen (CN)

(*) Notice: Subject to any disclaimer, the term of this patent is extended or adjusted under 35 U.S.C. 154(b) by 0 days.

(21) Appl. No.: 16/938,203

(22) Filed: Jul. 24, 2020

(65) Prior Publication Data
US 2020/0353613 A1 Nov. 12, 2020

Related U.S. Application Data

(63) Continuation of application No. PCT/CN2019/071541, filed on Jan. 14, 2019.

(30) Foreign Application Priority Data

Jan. 29, 2019 (CN) .......................... 201810084860.6

(51) Int. Cl.
*F16M 11/00* (2006.01)
*B25H 5/00* (2006.01)
(Continued)

(52) U.S. Cl.
CPC ............. *B25H 5/00* (2013.01); *F16M 11/046* (2013.01); *F16M 13/022* (2013.01);
(Continued)

(58) Field of Classification Search
CPC ...... B25H 5/00; F16M 11/046; F16M 13/022; F16M 2200/028
(Continued)

(56) References Cited

U.S. PATENT DOCUMENTS 6,113,046 A * 9/2000 Wang ................. A47B 21/0314
 248/278.1
6,994,306 B1 * 2/2006 Sweere ................. F16M 11/10
 248/295.11
(Continued)

FOREIGN PATENT DOCUMENTS

CN 202092645 U 12/2011
CN 106218527 A 12/2016
(Continued)

OTHER PUBLICATIONS

International Search Report dated Apr. 9, 2019; PCT/CN2019/071541.

*Primary Examiner* — Todd M Epps

(57) ABSTRACT

The present invention discloses a bracket apparatus. The bracket apparatus includes a pedestal, an upright rod and a sliding assembly. The pedestal supports the upright rod; the upright rod is disposed vertically with one end installed on the pedestal; and the sliding assembly includes a clamping member, an anti-skid member, a locking assembly and a holding member. The clamping member is installed on the upright rod and the clamping member is capable of sliding along the upright rod; the anti-skid member is installed on the clamping member; the locking assembly is connected to the anti-skid member, the locking assembly is configured to push the anti-skid member to abut against the rod, so that the clamping member is fixed on the upright rod, and the locking assembly is further configured to drive the anti-skid member out of the upright rod, so that the clamping member is capable of sliding along the upright rod; and the holding member is installed on the clamping member and is configured to carry a required calibration apparatus.

20 Claims, 11 Drawing Sheets

(51) Int. Cl.
   *F16M 11/04* (2006.01)
   *F16M 13/02* (2006.01)
   *G01S 13/931* (2020.01)
   *G01S 7/40* (2006.01)

(52) U.S. Cl.
   CPC .......... *F16M 2200/028* (2013.01); *G01S 7/40* (2013.01); *G01S 7/4026* (2013.01); *G01S 13/931* (2013.01); *G01S 2013/93271* (2020.01)

(58) Field of Classification Search
   USPC .......... 248/125.1, 125.2, 121, 122.1, 123.11
   See application file for complete search history.

(56) References Cited

U.S. PATENT DOCUMENTS

| | | | | |
|---|---|---|---|---|
| 6,997,422 | B2* | 2/2006 | Sweere | F16M 11/105 248/123.11 |
| 7,032,870 | B2* | 4/2006 | Sweere | F16M 11/18 248/295.11 |
| 7,506,853 | B2* | 3/2009 | Sweere | F16M 13/022 248/295.11 |
| 8,596,591 | B2* | 12/2013 | Theis | F16M 11/18 248/125.2 |
| 10,376,042 | B1* | 8/2019 | Johnson | A47B 21/06 |

FOREIGN PATENT DOCUMENTS

| | | |
|---|---|---|
| CN | 108161853 A | 6/2018 |
| CN | 208179458 U | 12/2018 |
| DE | 202015106939 U1 | 5/2016 |

\* cited by examiner

BRACKET APPARATUS

This application is a continuation of International Patent Application No. PCT/CN2019/071541 filed on Jan. 14, 2019, which claims priority to Chinese Patent Application No. 201810084860.6 filed on Jan. 29, 2018, both of which are incorporated by reference herein in their entireties.

BACKGROUND

Technical Field

The present application relates to the fields of automobile maintenance and device calibration technologies, and in particular, to a bracket apparatus capable of carrying a calibration apparatus.

Related Art

In the fields of automobile maintenance and production, a plurality of positions often need to be calibrated in a same coordinate direction during the calibration or correction of a certain device. For example, in an installation and maintenance process of an automotive radar, if a radar installation position and an angle deviation are relatively large, the radar may fail in playing a role of sensing, causing safety hazards. Therefore, after being installed, the automotive radar needs to be calibrated.

At present, a bracket apparatus is often used to carry a radar calibration apparatus. The bracket apparatus includes an upright rod and a sliding block. The sliding block is installed on the upright rod and the sliding block carries the radar calibration apparatus. However, when the sliding block slides on the upright rod, the bracket apparatus has no self-locking function. Consequently, the sliding block is easy to go into a free fall to break the sliding block.

SUMMARY

Embodiments of the present invention provide a bracket apparatus having a locking function, to resolve the technical problem in the prior art that a sliding block of a bracket apparatus is easy to go into a free fall.

The embodiments of the present invention adopt the following technical solutions to resolve the technical problem:

A bracket apparatus includes a pedestal, an upright rod and a sliding assembly. The pedestal supports the upright rod; the upright rod is disposed vertically with one end installed on the pedestal; and the sliding assembly includes a clamping member, an anti-skid member, a locking assembly and a holding member. The clamping member is installed on the upright rod and the clamping member is capable of sliding along the upright rod; the anti-skid member is installed on the clamping member; the locking assembly is connected to the anti-skid member, the locking assembly is configured to push the anti-skid member to abut against the upright rod, so that the clamping member is fixed on the upright rod, and the locking assembly is further configured to drive the anti-skid member out of the upright rod, so that the clamping member slides along the upright rod; and the holding member is installed on the clamping member and is configured to carry a required calibration apparatus.

Optionally, the locking assembly includes a handle, a pushing block, a first elastic member and a compressing member, where the pushing block runs through the handle and the pushing block is connected to the anti-skid member;

the first elastic member is compressed between the pushing block and the compressing member and the first elastic member is configured to provide an elastic restoring force to push the pushing block and the anti-skid member, so that the anti-skid member abuts against the upright rod; and the handle is configured to push the pushing block away from the clamping member, to drive the anti-skid member out of the upright rod.

Optionally, the locking assembly includes a handle, a pushing block and a first elastic member, where the pushing block runs through the handle and the pushing block is connected to the anti-skid member;

the first elastic member is compressed between the pushing block and the holding member and the first elastic member is configured to provide an elastic restoring force to push the pushing block and the anti-skid member, so that the anti-skid member abuts against the upright rod; and the handle is configured to push the pushing block away from the clamping member, to drive the anti-skid member out of the upright rod.

Optionally, the anti-skid member is provided with a first accommodation groove, where the pushing block includes a pushing block body and a connection bump, the connection bump being connected to the pushing block body and the connection bump being inserted into the first accommodation groove; and the handle is sheathed on the connection bump, the handle is disposed between the pushing block body and the anti-skid member and the handle abuts against the clamping member.

Optionally, the handle includes a pressing portion, a connection portion and an installation portion, where the installation portion is provided with an installation through hole, the connection bump runs through the installation through hole, the installation portion is disposed between the pushing block body and the anti-skid member and the installation portion abuts against the clamping member; and the connection portion is connected between the pressing portion and the installation portion.

Optionally, an angle between the connection portion and the pressing portion is an obtuse angle and an angle between the connection portion and the installation portion is an obtuse angle.

Optionally, the anti-skid member includes a body portion and a tightening bump, where the tightening bump is connected to the body portion and the tightening bump is configured to abut against the upright rod.

Optionally, the holding member is provided with an axle hole, configured to accommodate a fixed axle of the calibration apparatus.

Optionally, the holding member is provided with a first accommodation hole, the first accommodation hole being communicated with the axle hole; and the sliding assembly includes a dowel, the dowel being inserted into the first accommodation hole and being configured to fix the fixed axle of the calibration apparatus.

Optionally, the dowel is inserted into the first accommodation hole and then runs through the axle hole and one end of the dowel running through the axle hole is fixed on an inner wall of the axle hole.

Optionally, the holding member is provided with a second accommodation hole, the second accommodation hole being communicated with the axle hole; and the sliding assembly includes a strengthening member, the strengthening member including a strengthening member body, a second elastic member and a glass bead, where the second elastic member is accommodated in the strengthening member body, one end of the second elastic member is fixedly installed on the strengthening member body and the other end is fixedly installed on the glass bead; and the glass bead is configured to abut against the fixed axle of the calibration apparatus.

Optionally, the holding member is provided with an accommodation cavity, the accommodation cavity being configured to accommodate the locking assembly.

Optionally, the clamping member includes a connection board, a first clamping board and a second clamping board, where the connection board is connected between the first clamping board and the second clamping board, which are located at two opposite sides of the upright rod respectively; and an accommodation channel is formed among the connection board, the first clamping board and the second clamping board, the accommodation channel accommodating the upright rod.

Optionally, the pedestal includes a pedestal body, a horizontal adjusting member and a gradienter, where one end of the upright rod is fixedly installed on the pedestal body;

the horizontal adjusting member is installed on the pedestal body and is configured to adjust a horizontal angle of the pedestal body; and the gradienter is installed on the pedestal body and is configured to detect whether the pedestal body is disposed horizontally.

Optionally, the pedestal includes a supporting member, one end of the supporting member being fixedly installed on a lower surface of the pedestal body and a quantity of the supporting members being at least one, where one intersection point formed by one supporting member intersecting the lower surface and two intersection points formed by two horizontal adjusting members intersecting the lower surface respectively are located at three vertices of an isosceles triangle respectively.

Optionally, a quantity of the supporting members is three, the three supporting members being arranged neatly along a first straight line; and two horizontal adjusting members are arranged neatly along a second straight line, the first straight line being parallel to the second straight line.

Optionally, the horizontal adjusting member includes a hand lever and a threaded rod portion, where the hand lever is fixedly installed on one end of the threaded rod portion and the hand lever is located above the pedestal body and is configured to facilitate rotation of the horizontal adjusting member; and the threaded rod portion runs through the pedestal body, the threaded rod portion is in screw-thread fit with the pedestal body and the threaded rod portion is disposed vertically.

Optionally, a quantity of the horizontal adjusting members is at least three, where three horizontal adjusting members intersect the lower surface of the pedestal body to form three intersection points, the three intersection points being located at three vertices of an isosceles triangle respectively.

Optionally, the gradienter is installed on an upper surface of the pedestal body and the gradienter includes a first horizontal bead and a second horizontal bead, the first horizontal bead and the second horizontal bead being perpendicular to each other.

Optionally, the upper surface of the pedestal body is provided with a first correcting line, a second correcting line and a third correcting line, where the first correcting line and the second correcting line are located at a same straight line; and the third correcting line is perpendicular to the first correcting line and the second correcting line and a straight line at which the third correcting line is located passes through an intersection point of the upright rod and the pedestal body.

Optionally, the upper surface of the pedestal body is provided with a first correcting line and a third correcting line, where the third correcting line is perpendicular to the first correcting line and a straight line at which the third correcting line is located passes through an intersection point of the upright rod and the pedestal body.

Optionally, the upright rod is provided with a height gauge, configured to measure a movement distance or height of the sliding assembly.

Compared with the prior art, in the bracket apparatus according to the embodiments of the present invention, the locking assembly can push the anti-skid member to abut against the upright rod, so that the sliding assembly can be fixed on the upright rod, and the sliding assembly can be prevented from going into a free fall to break the sliding assembly. At the same time, the locking assembly can drive the anti-skid member out of the upright rod, so that the sliding assembly can slide freely along the upright rod. A height of the calibration apparatus carried by the sliding assembly can be adjusted according to requirements, and different height requirements can be satisfied to meet a calibration requirement.

BRIEF DESCRIPTION OF THE DRAWINGS

Exemplary descriptions of one or more embodiments are provided through accompanying drawings corresponding to the one or more embodiments. These exemplary descriptions do not constitute any limitation on the embodiments. Elements having identical reference numerals in the drawings represent similar elements. Unless particularly stated, figures in the accompanying drawings do not constitute any proportional limitation.

DETAILED DESCRIPTION

For ease of understanding the present invention, the present invention is described in further detail below with reference to the accompanying drawings and specific embodiments. It should be noted that when an element is described as being "fixed" on another element, the element may be directly on the another element, or one or more intermediate elements may exist therebetween. When an element is described as being "connected" to another element, the element may be directly connected to the another element, or one or more intermediate elements may exist therebetween. Terms such as "perpendicular", "horizontal", "left", "right", "inner", "outer" and similar expressions used in this specification are merely used for the purpose of description.

Unless otherwise defined, meanings of all technical and scientific terms used in this specification are the same as those usually understood by a person skilled in the technical field to which the present invention belongs. The terms used in the specification of the present invention are merely intended to describe specific embodiments rather than limiting the present invention. The term "and/or" used in this specification includes any or all combinations of one or more related listed items.

In addition, technical features involved in different embodiments of the present invention described below may be combined as long as the technical features do not conflict with each other.

Figure 1:
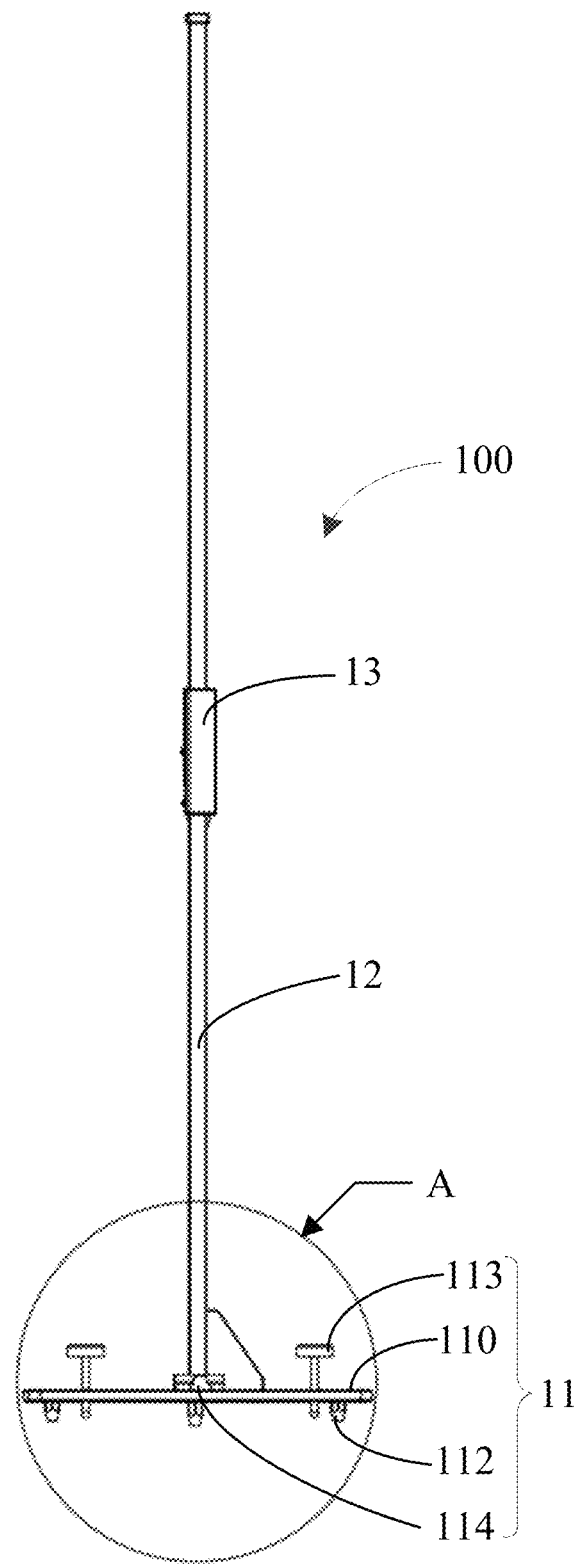
FIG. 1 is a three-dimensional diagram of a bracket apparatus according to an embodiment of the present invention.
Figure 2:
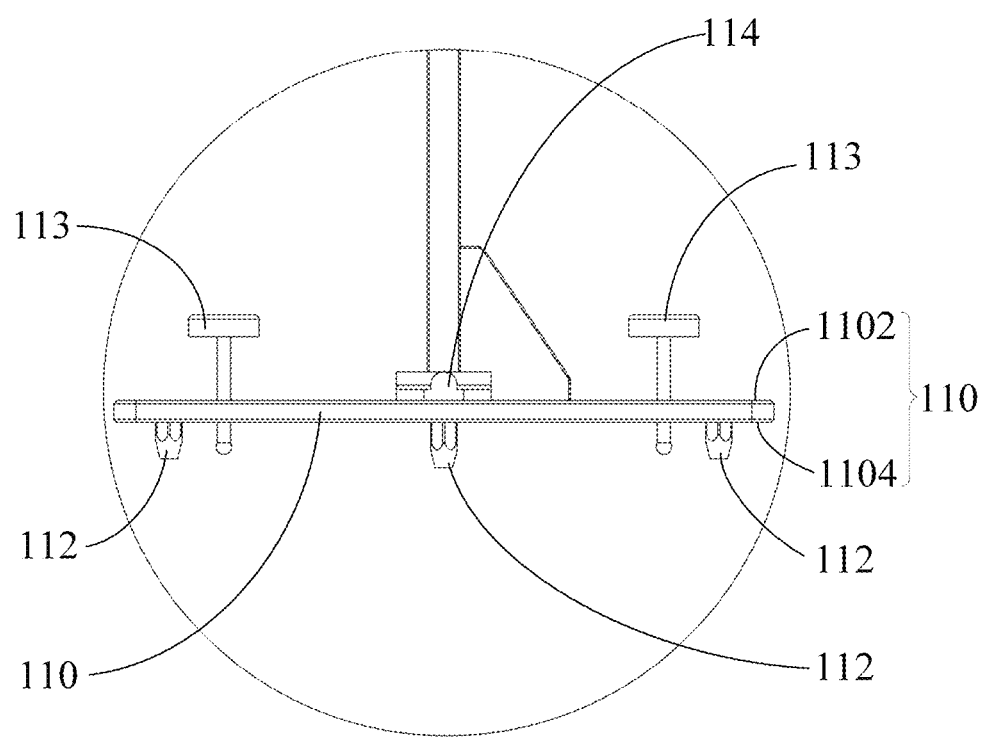
FIG. 2 is an enlarged partial diagram of section A in FIG. 1.

Referring to FIG. 1 and FIG. 2 together, an embodiment of the present invention provides a bracket apparatus 100, including a pedestal 11, an upright rod 12 and a sliding assembly 13. The upright rod 12 is disposed vertically with one end installed on the pedestal 11. The sliding assembly 13 is movably installed on the upright rod 12 and the sliding assembly 13 is capable of sliding along the upright rod 12.

The pedestal 11 includes a pedestal body 110, a supporting member 112, a horizontal adjusting member 113 and a gradienter 114.

Figure 13:
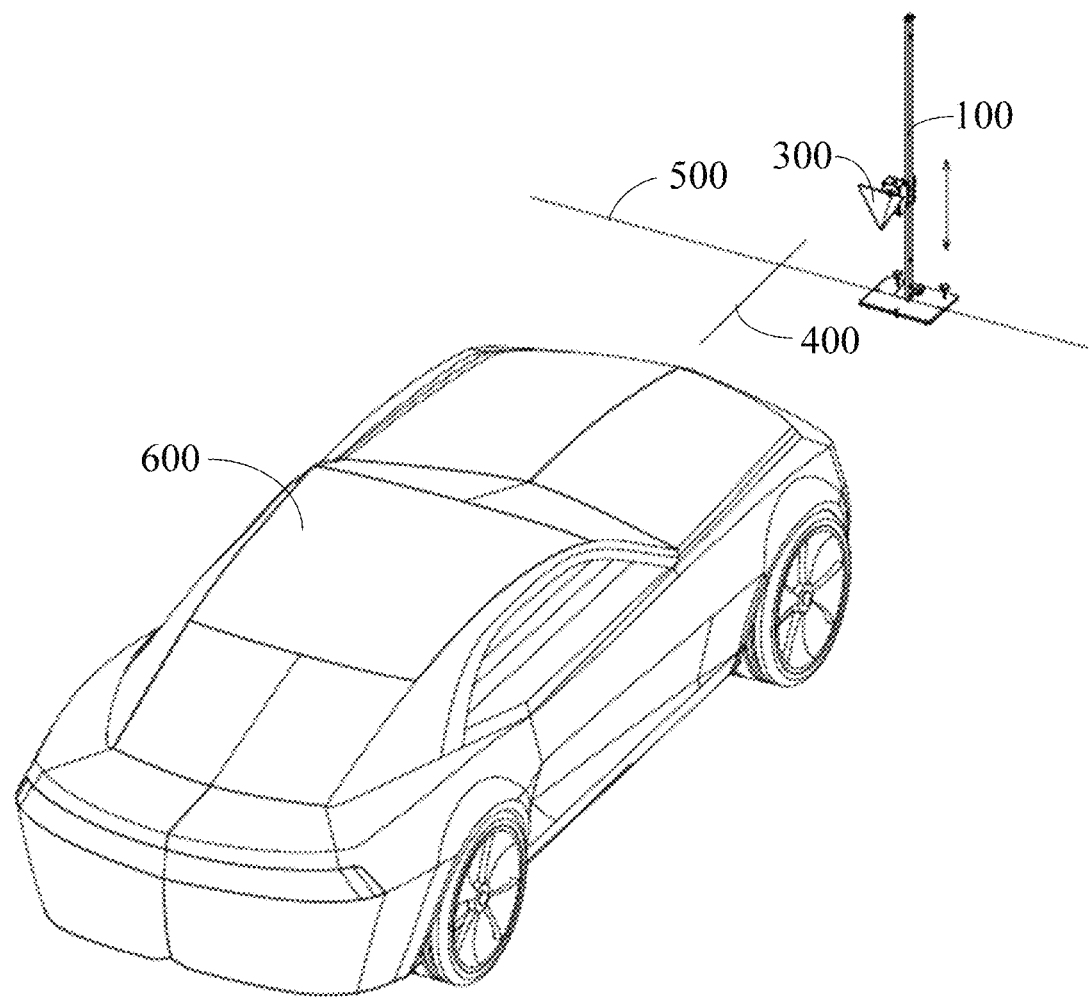
FIG. 13 to FIG. 15 are schematic diagrams of different steps of calibrating a vehicle-mounted radar by using the bracket apparatus shown in FIG. 1 to carry a laser angle reflection apparatus.

The pedestal body 110 is a rectangular plate, which may be made of a relatively heavy metal material, so that the center of gravity of the bracket apparatus 10 is relatively low, so as to stably support a calibration apparatus connected to the sliding assembly 13, for example, a laser angle reflection apparatus 300 (referring to FIG. 13). The pedestal body 110 includes an upper surface 1102 and a lower surface 1104.

Figure 3:
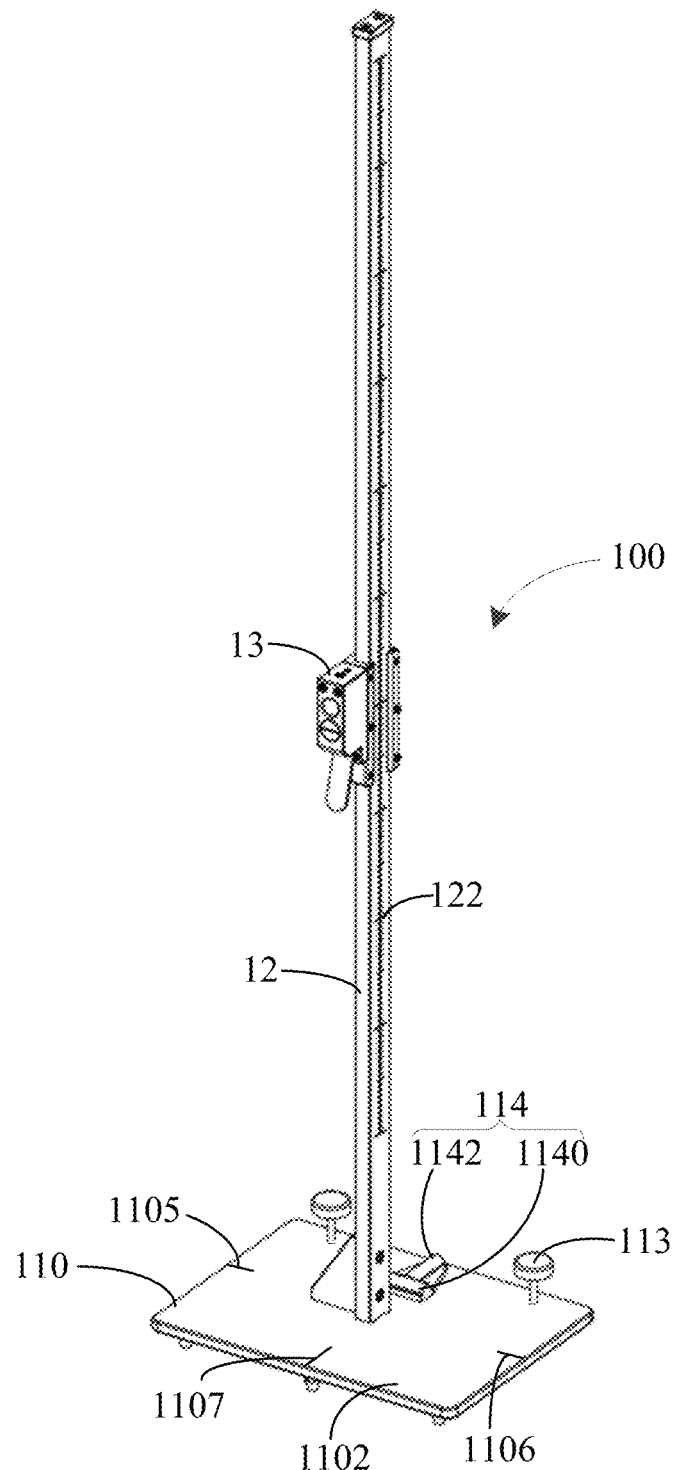
FIG. 3 is a three-dimensional diagram of another angle of the bracket apparatus shown in FIG. 1.
Figure 4:
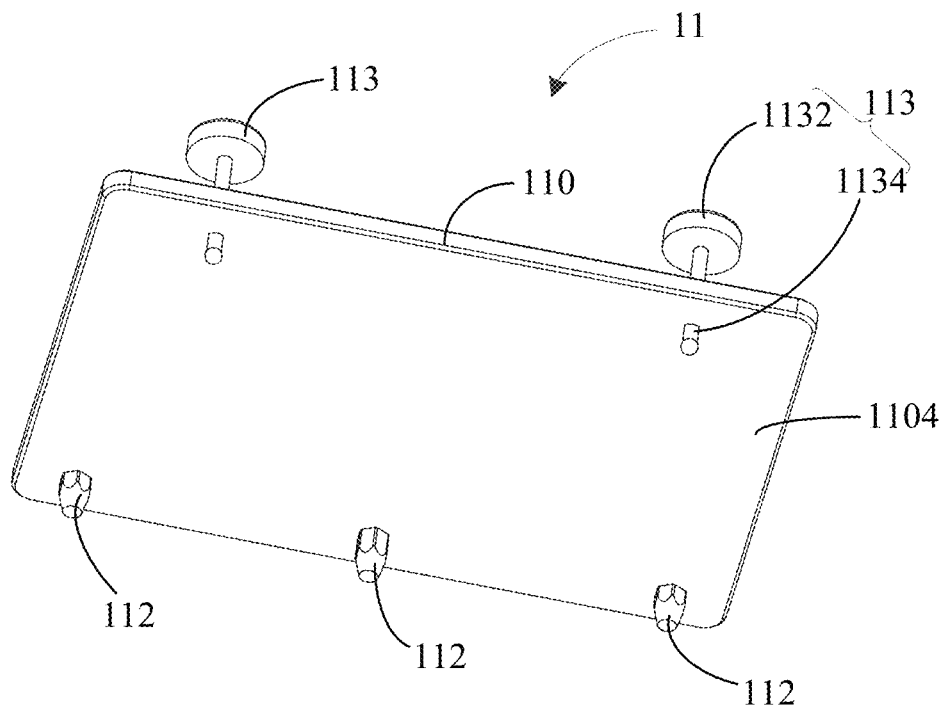
FIG. 4 is a three-dimensional diagram of a pedestal of the bracket apparatus shown in FIG. 1.

Referring to FIG. 3 and FIG. 4 together, the upper surface 1102 is provided with a first correcting line 1105, a second correcting line 1106 and a third correcting line 1107. The first correcting line 1105 and the second correcting line 1106 are located at a same straight line. The third correcting line 1107 is perpendicular to the first correcting line 1105 and the second correcting line 1106. It can be understood that, in some other embodiments, one or both of the first correcting line 1105 and the second correcting line 1106 may be omitted. That is, the upper surface 1102 is only provided with the first correcting line 1105, or only provided with the second correcting line 1106, or not provided with the first correcting line 1105 or the second correcting line 1106.

Certainly, the upper surface 1102 may be further provided with a fourth correcting line (not shown in the figure), the fourth correcting line and the third correcting line 1107 being located at a same straight line, which is not limited herein.

The lower surface 1104 is provided with the supporting member 112. The supporting member 112 is roughly columnar and disposed along a vertical direction and one end of the supporting member 112 is fixedly installed on the lower surface 1104. Three supporting members 112 are neatly arranged along a first straight line, the first straight line being parallel to the first correcting line 1105 and the second correcting line 1106.

The horizontal adjusting member 113 includes a hand lever 1132 and a threaded rod portion 1134, the hand lever 1132 being fixedly installed on one end of the threaded rod portion 1134. The threaded rod portion 1134 runs through the upper surface 1102 and the lower surface 1104, the threaded rod portion 1134 is in screw-thread fit with the pedestal body 110 and the threaded rod portion 1134 is disposed vertically. The hand lever 1132 is located above the upper surface 1102 and is configured to facilitate rotation of the horizontal adjusting member 113, so that the horizontal adjusting member 113 is made to move relative to the pedestal body 110 along a vertical direction, to adjust a pitch angle of the pedestal body 110. Two horizontal adjusting members 113 are arranged neatly along a second straight line, the first straight line being parallel to the second straight line. one intersection point formed by one supporting member 112 intersecting the lower surface 1104 and two intersection points formed by two horizontal adjusting members 113 intersecting the lower surface 1104 respectively are located at three vertices of an isosceles triangle respectively.

It can be understood that, in some other embodiments, a quantity of the supporting members 112 may be increased or decreased according to actual requirements as long as the quantity is at least one. One intersection point formed by one supporting member 112 intersecting the lower surface 1104 and two intersection points formed by two horizontal adjusting members 113 intersecting the lower surface 1104 respectively are located at three vertices of an isosceles triangle respectively.

It can be understood that, in some other embodiments, the horizontal adjusting member 113 may adopt other structures as long as the pitch angle of the pedestal body 110 can be adjusted. A quantity of the horizontal adjusting members 113 may also be at least three, and the supporting member 112 is omitted, where three horizontal adjusting members 113 intersect the lower surface 1104 of the pedestal body 110 to form three intersection points, the three intersection points being located at three vertices of an isosceles triangle respectively.

The gradienter 114 is installed on the upper surface 1102 and is configured to detect whether the pedestal body 110 is disposed horizontally. The gradienter 114 includes a first horizontal bead 1140 and a second horizontal bead 1142, the first horizontal bead 1140 and the second horizontal bead 1142 being perpendicular to each other. It can be understood that, in some other embodiments, the gradienter 114 may adopt other structures as long as the gradienter 114 can be configured to detect whether the pedestal body 110 is disposed horizontally.

One end of the upright rod 12 is fixedly installed on the upper surface 1102 and the upright rod 12 is perpendicular to the pedestal body 110. A straight line at which the third correcting line 1107 is located runs through an intersection point of the upright rod 12 and the pedestal body 110. The upright rod 12 is provided with a height gauge 122, configured to measure a movement distance or height of the sliding assembly 13.

Figure 5:
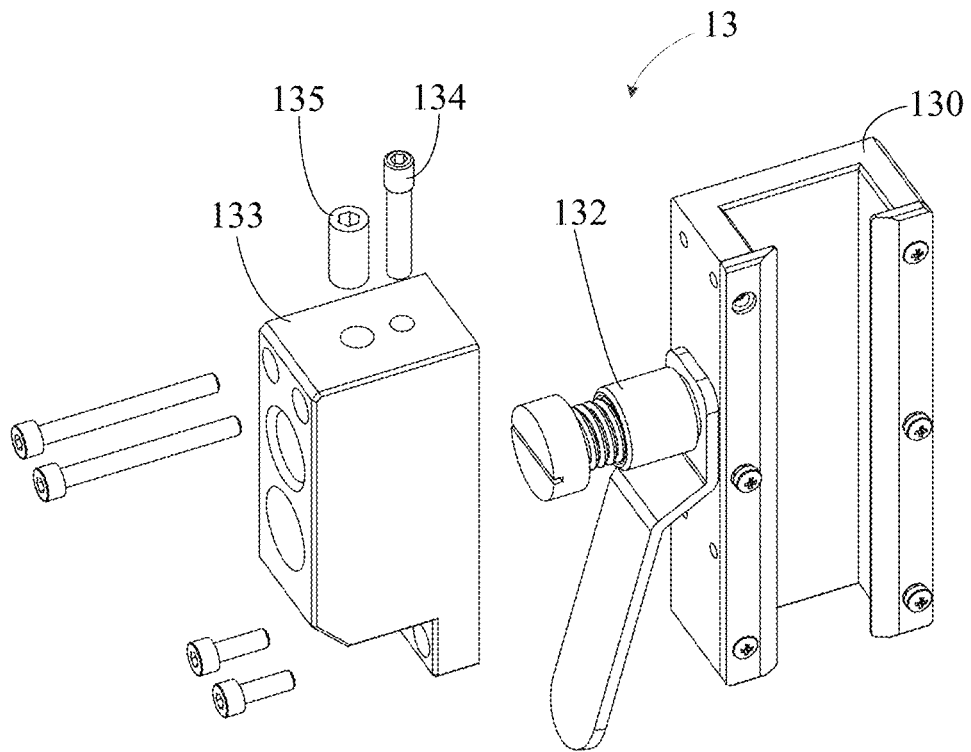
FIG. 5 is a partial exploded view of a sliding assembly of the bracket apparatus shown in FIG. 1.
Figure 6:
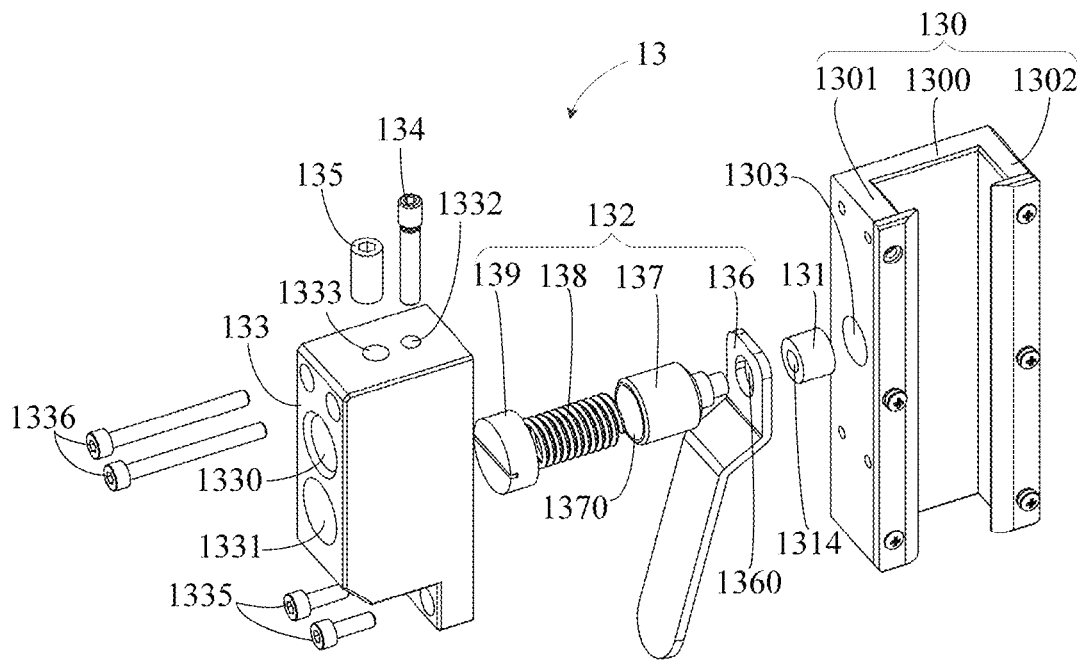
FIG. 6 is an exploded view of a sliding assembly of the bracket apparatus shown in FIG. 1.

Referring to FIG. 5 and FIG. 6 together, the sliding assembly 13 includes a clamping member 130, an anti-skid member 131, a locking assembly 132, a holding member 133, a dowel 134 and a strengthening member 135. The clamping member 130 is installed on the upright rod 12 and the clamping member 130 is capable of sliding along the upright rod 12. The anti-skid member 131 is installed on the clamping member 130. The locking assembly 132 is connected to the anti-skid member 131, the locking assembly 132 is configured to push the anti-skid member 131 to abut against the upright rod 12, so that the clamping member 130 is fixed on a required position, and the locking assembly 132 is further configured to drive the anti-skid member 131 out of the upright rod 12, so that the clamping member 130 slides freely along the upright rod 12. The holding member 133 is installed on the clamping member 130 and is configured to carry a required calibration apparatus, for example, the laser angle reflection apparatus 300 (referring to FIG. 13). The dowel 134 is installed on the holding member 133 and is configured to lock the calibration apparatus on the holding member 133. The strengthening member 135 is installed on the holding member 133 and is configured to further fix the calibration apparatus on the holding member 133.

Figure 7:
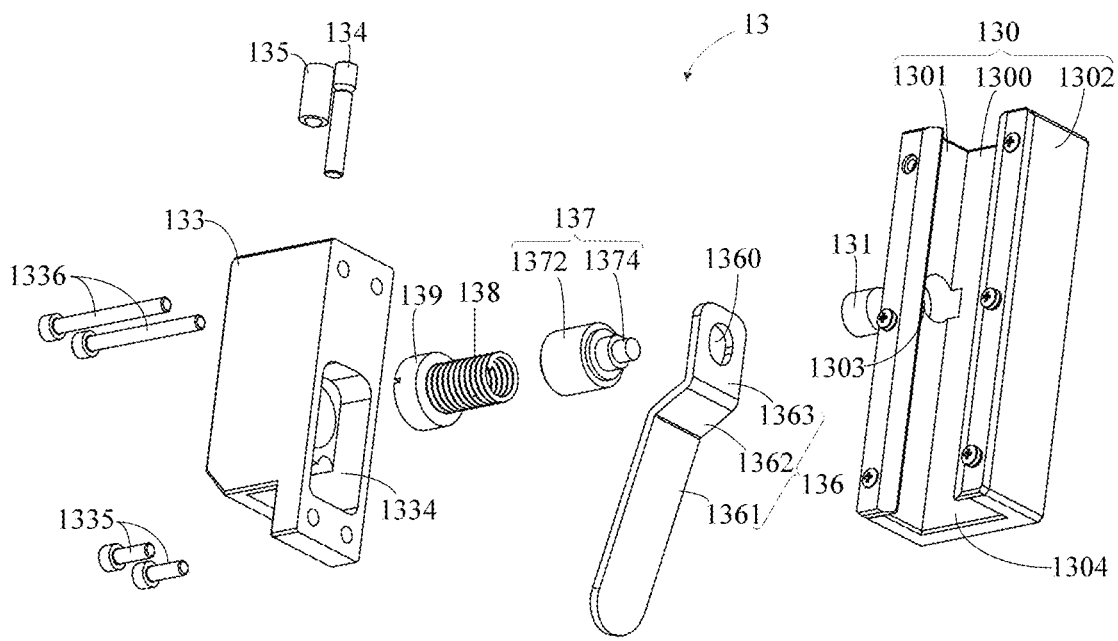
FIG. 7 is an exploded view of another angle of a sliding assembly of the bracket apparatus shown in FIG. 1.
Figure 8:
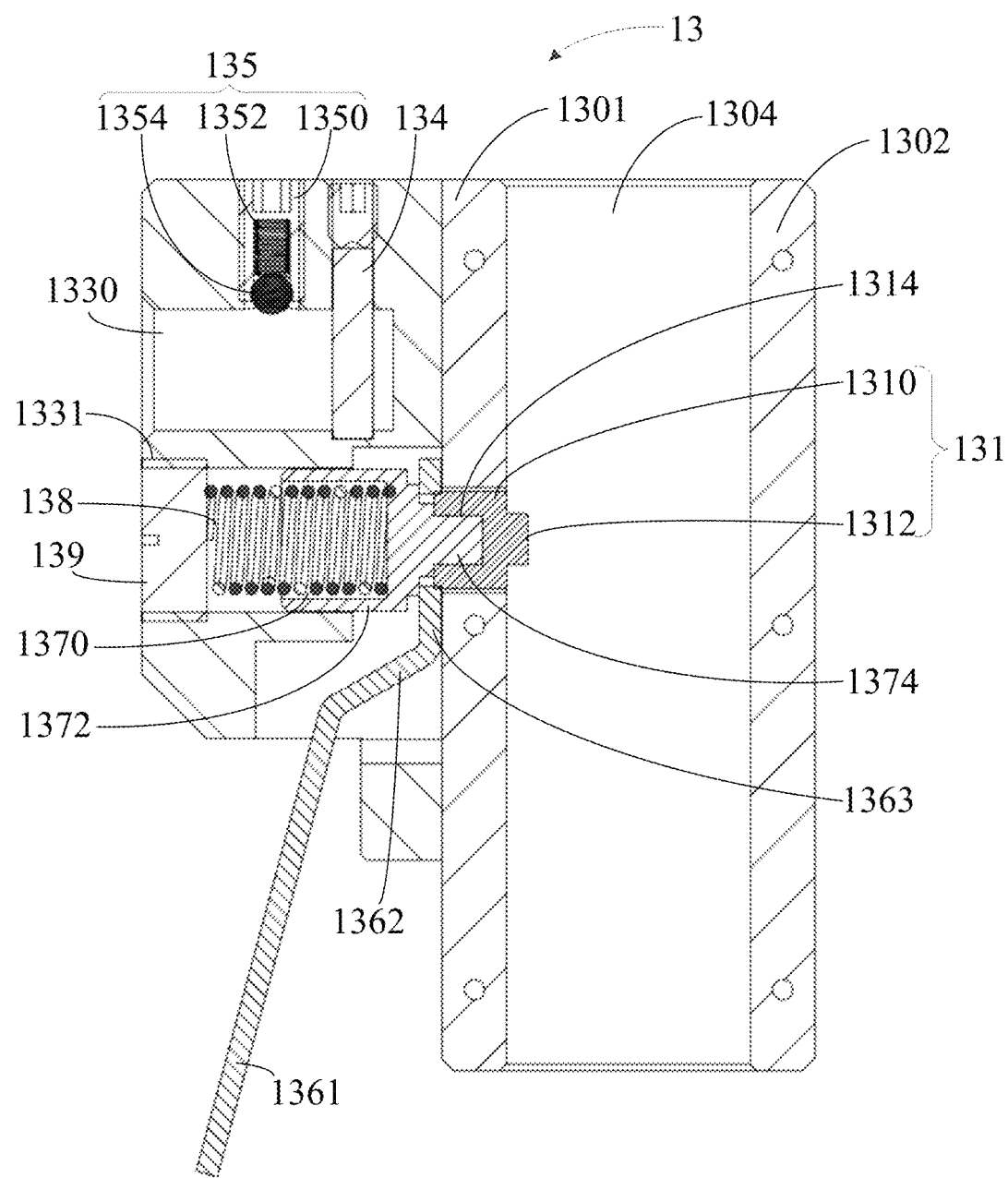
FIG. 8 is a cross-sectional view of a sliding assembly of the bracket apparatus shown in FIG. 1.

Referring to FIG. 7 and FIG. 8 together with FIG. 6, the clamping member 130 includes a connection board 1300, a first clamping board 1301 and a second clamping board 1302. The connection board 1300 is connected between the first clamping board 1301 and the second clamping board 1302, which are located at two opposite sides of the upright rod 12 respectively and abut against the upright rod 12 respectively. An accommodation channel 1304 is formed among the connection board 1300, the first clamping board 1301 and the second clamping board 1302, the accommodation channel 1304 accommodating the upright rod 12. The first clamping board 1301 is provided with a through hole 1303, the through hole 1303 accommodating the anti-skid member 131.

The anti-skid member 131 may be made of an elastic material such as a plastic material or a rubber material and the anti-skid member 131 includes a body portion 1310 and a tightening bump 1312 (see FIG. 8). The tightening bump 1312 extends out from the body portion 1310 and the tightening bump 1312 may extend into the accommodation channel 1304 to abut against the upright rod 12. The body portion 1310 is provided with a first accommodation groove 1314, the first accommodation groove 1314 being configured to partially accommodate the locking assembly 132. In this embodiment, the anti-skid member 131 is provided with the tightening bump 1312, which may extend into the accommodation channel 1304 to effectively abut against the upright rod 12. It can be understood that, in some other embodiments, the tightening bump 1312 may be omitted and the body portion 1310 may partially extend into the accommodation channel 1304 to abut against the upright rod 12.

The locking assembly 132 includes a handle 136, a pushing block 137, a first elastic member 138 and a compressing member 139.

The pushing block 137 runs through the handle 136 and the pushing block 137 is connected to the anti-skid member 131. The pushing block 137 may be made of a plastic materials or a metal material and includes a pushing block body 1372 and a connection bump 1374. The connection bump 1374 extends out from the pushing block body 1372 and the connection bump 1374 is inserted into the first accommodation groove 1314, so that the anti-skid member 131 is connected to the pushing block 137. The pushing block 137 is provided with a second accommodation groove 1370, which partially accommodates the first elastic member 138.

The first elastic member 138 is compressed between the pushing block 137 and the compressing member 139 and the first elastic member 138 is configured to provide an elastic restoring force to push the pushing block 137 and the anti-skid member 131, so that the anti-skid member 131 extends into the accommodation channel 1304 to abut against the upright rod 12, to fix the sliding assembly 13 on the upright rod 12. The first elastic member 138 is a pressure spring with one end accommodated in the second accommodation groove 1370 and the other end fixedly connected to the compressing member 139. It can be understood that, in some other embodiments, the first elastic member 138 may be a spring piece or the like as long as an elastic restoring force can be provided to push the pushing block 137 and the anti-skid member 131.

In this embodiment, the anti-skid member 131 is provided with a first accommodation groove 1314, the first accommodation groove 1314 accommodating the connection bump 1374 to facilitate installation of the pushing block 137 and the anti-skid member 131 together. It can be understood that, in some other embodiments, the anti-skid member 131 and the pushing block 137 may adopt other connection manners. For example, the first accommodation groove 1314 and the connection bump 1374 are omitted and the anti-skid member 131 and the pushing block 137 are held together by glue.

The compressing member 139 is fixedly installed on the holding member 133 and is configured to provide support for the first elastic member 138, so that the first elastic member 138 may provide an elastic restoring force to push the pushing block 137 and the anti-skid member 131. The compressing member 139 is made of a plastic material or a metal material. It can be understood that, in some other embodiments, the compressing member 139 may be omitted. One end of the first elastic member 138 is directly fixed on the holding member 133, that is, the first elastic member 138 is compressed between the pushing block 137 and the holding member 133.

The handle 136 is a long strip, including a pressing portion 1361, a connection portion 1362 and an installation portion 1363. The installation portion 1363 is provided with an installation through hole 1360, the connection bump 1374 runs through the installation through hole 1360, the installation portion 1363 is disposed between the pushing block body 1372 and the anti-skid member 131 and the installation portion 1363 abuts against the first clamping board 1301. The connection portion 1362 is connected between the pressing portion 1361 and the installation portion 1363. An angle between the connection portion 1362 and the pressing portion 1361 is an obtuse angle and an angle between the connection portion 1362 and the installation portion 1363 is also an obtuse angle. The pressing portion 1361 is configured to facilitate the user to grip to provide a pressing push to the handle 136.

Figure 9:
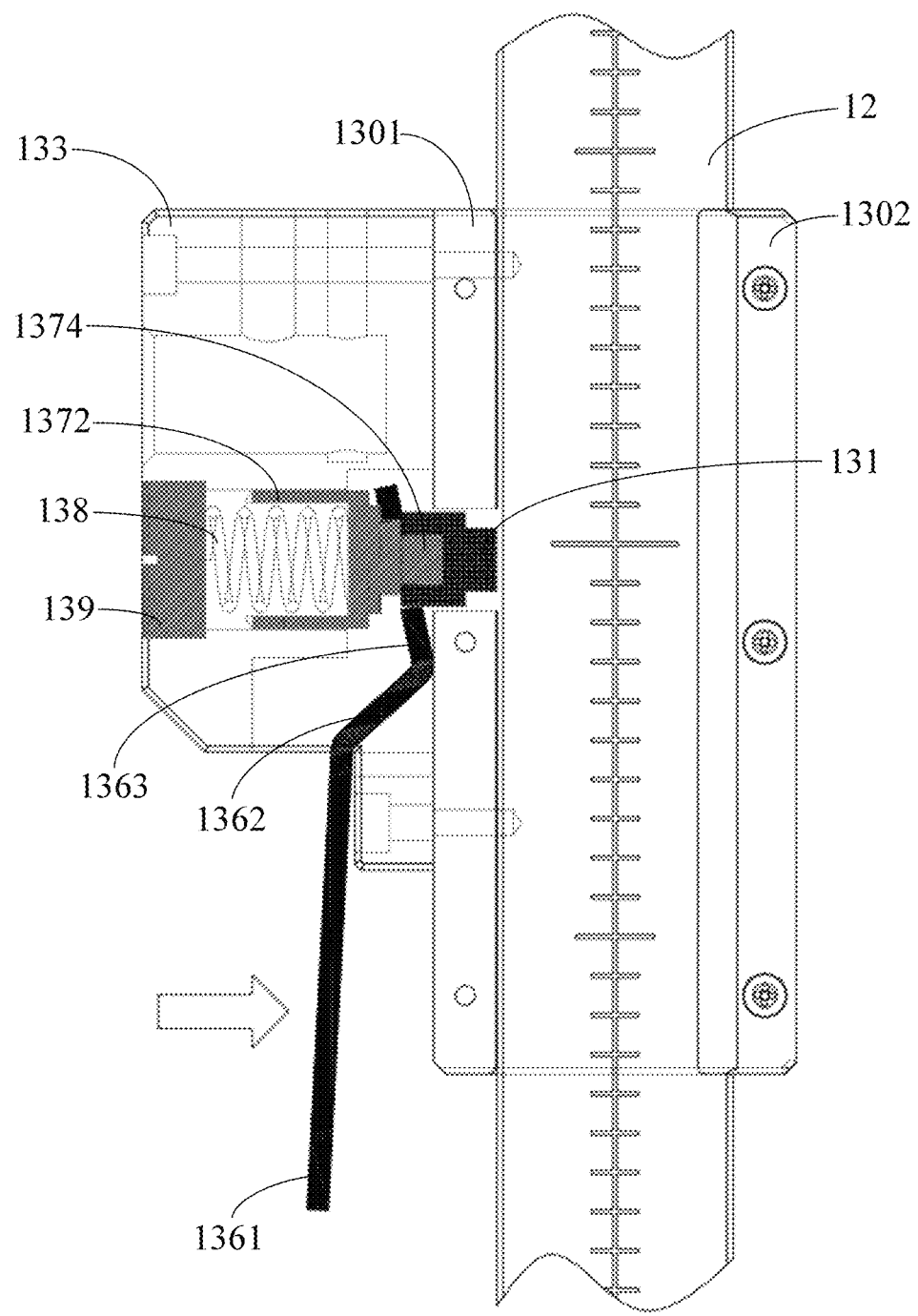
FIG. 9 is a schematic assembly diagram of a sliding assembly and an upright rod of the bracket apparatus shown in FIG. 1, where a handle of the sliding assembly is pressed.

Referring to FIG. 9, when the pressing portion 1361 is pressed in a direction of the first clamping board 1301 (that is, a direction of an arrow in FIG. 9), the handle 136 rotates by using a junction of the connection portion 1362 and the installation portion 1363 as a fulcrum. The installation portion 1363 pushes the pushing block body 1372 away from the first clamping board 1301 and drives the anti-skid member 131 out of the upright rod 12. In this case, the first elastic member 138 is further compressed and the sliding assembly 13 may slide freely along the upright rod 12.

Figure 10:
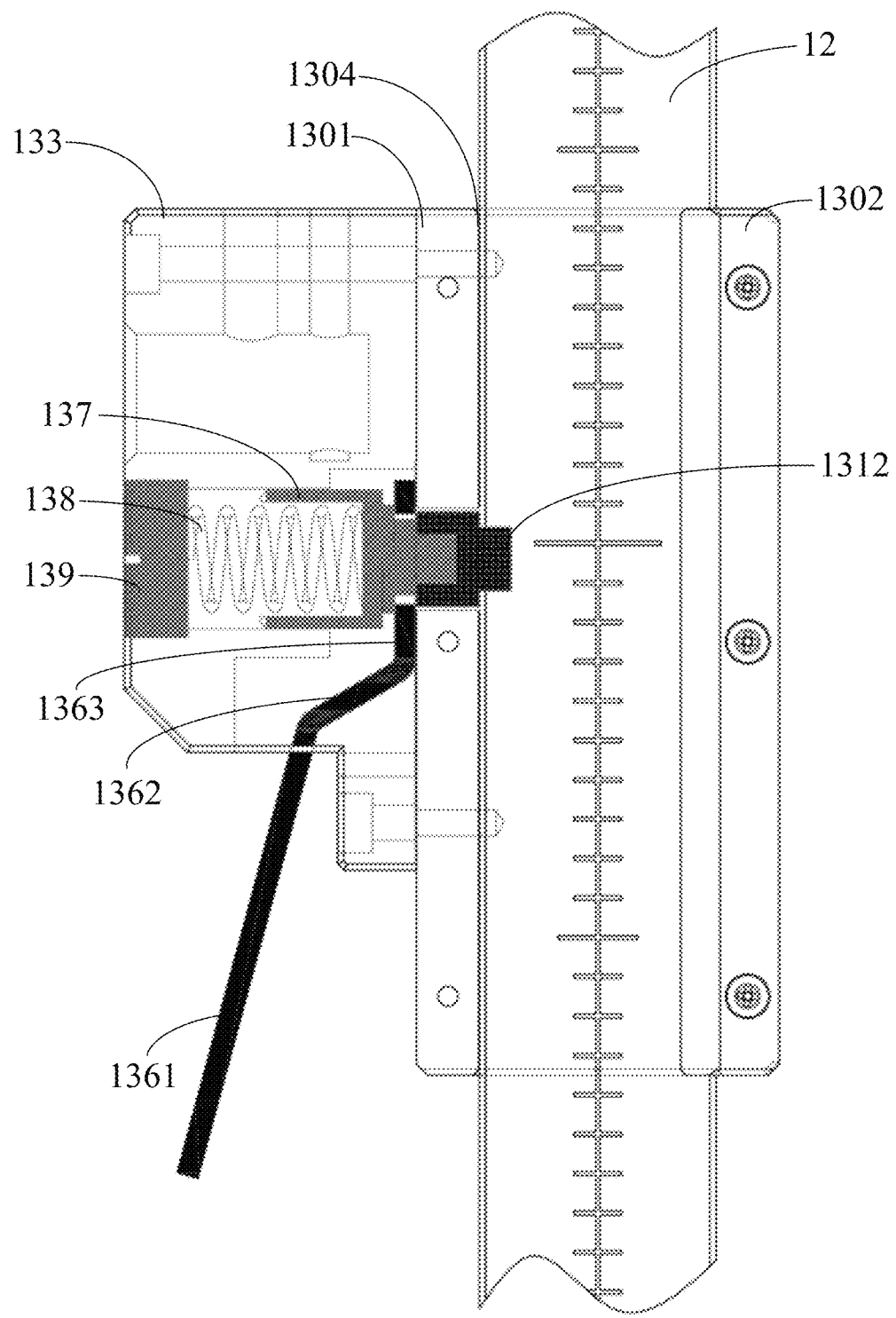
FIG. 10 is a schematic assembly diagram of a sliding assembly and an upright rod of the bracket apparatus shown in FIG. 1, where a handle of the sliding assembly is released.

Referring to FIG. 10, a press on the pressing portion 1361 is released. The first elastic member 138 provides an elastic restoring force to push the pushing block 137 and the anti-slip block 131 to move towards the first clamping board 1301. The tightening bump 1312 extends into the accommodation channel 1304 and abuts against the upright rod 12, so that the sliding assembly 13 is fixed on the upright rod 12 and stays at a required position.

In this embodiment, the locking assembly 132 adopts the first elastic member 138 to push the pushing block 137 and the anti-skid member 131, so that the anti-skid member 131 abuts against the upright rod 12, to fix the sliding assembly 13 on the upright rod 12. The handle 136 is adopted to push the pushing block 137 and the anti-skid member 131 away from the upright rod 12, to drive the anti-skid member 131 out of the upright rod 12, so that the sliding assembly 13 may slide freely relative to the upright rod 12, to facilitate sliding of the sliding assembly 13 to the required position. It can be understood that, in some other embodiments, the locking assembly 132 may adopt other structures as long as the anti-skid member 131 can be pushed to abut against the upright rod 12 and the anti-skid member 131 can be driven out of the upright rod 12.

Referring to FIG. 6 to FIG. 8 again, the holding member 133 is fixedly installed on the clamping member 130 and the holding member 133 includes a first screw 1335 and a second screw 1336. Two first screws 1335 and two second screws 1336 run through the holding member 133 respectively to fix the holding member 133 on the clamping member 130. It can be understood that, in some other embodiments, the first screw 1335 and the second screw 1336 may be omitted and the holding member 133 may be fixed on the clamping member 130 in other manners, for example, by welding.

The holding member 133 is provided with an axle hole 1330, a fixing hole 1331, a first accommodation hole 1332, a second accommodation hole 1333 and an accommodation cavity 1334.

The axle hole 1330 is a cylindrical through hole, configured to accommodate the fixed axle of the calibration set. An axle wire of the axle hole 1330 is parallel to the third correcting line 1107, the axle wire of the axle hole 1330 and the third correcting line 1107 being located at a same vertical plane.

The fixing hole 1331 is a cylindrical through hole, which is close to the axle hole 1330. The fixing hole 1331 accommodates the compressing member 139, the fixing hole 1331 is provided with an internal thread and the compressing member 139 is provided with an external thread. The compressing member 139 is fixed in the fixing hole 1331 through screw-thread fit of the internal thread and the external thread.

The first accommodation hole 1332 is a through hole disposed vertically, which is communicated with the axle hole 1330. The first accommodation hole 1332 is configured to accommodate the dowel 134.

The second accommodation hole 1333 is also a through hole disposed vertically, which is communicated with the axle hole 1330. The second accommodation hole 1333 is configured to accommodate the strengthening member 135.

The accommodation cavity 1334 is communicated with the fixing hole 1331 and the accommodation cavity 1334 is configured to accommodate the pushing block 137, the first elastic member 138 and a part of the handle 136.

An outer contour of the dowel 134 is roughly cylindrical and may be made of a metal material such as a steel material. The dowel 134 is inserted into the first accommodation hole 1332 and then runs through the axle hole 1330 and one end of the dowel 134 runs through the axle hole 1330 is fixed on an inner wall of the axle hole 1330. The dowel 134 is in screw-thread fit with the holding member 133. The dowel 134 is configured to be inserted into an installation hole of the fixed axle of the calibration apparatus, to fix the fixed axle in the axle hole 1330.

The strengthening member 135 includes a strengthening member body 1350, a second elastic member 1352 and a glass bead 1354. An outer contour of the strengthening member body 1350 is roughly cylindrical and the strengthening member body 1350 is in screw-thread fit with the holding member 133. The strengthening member body 1350 is provided with a groove. The groove is roughly cylindrical and disposed vertically. The second elastic member 1352 is accommodated in the accommodation channel, one end of the second elastic member 1352 is fixedly installed on an inner wall of the groove and the other end is fixedly installed on the glass bead 1354. The second elastic member 1352 is a pressure spring. A part of the glass bead 1354 extends into the axle hole 1330.

Figure 11:
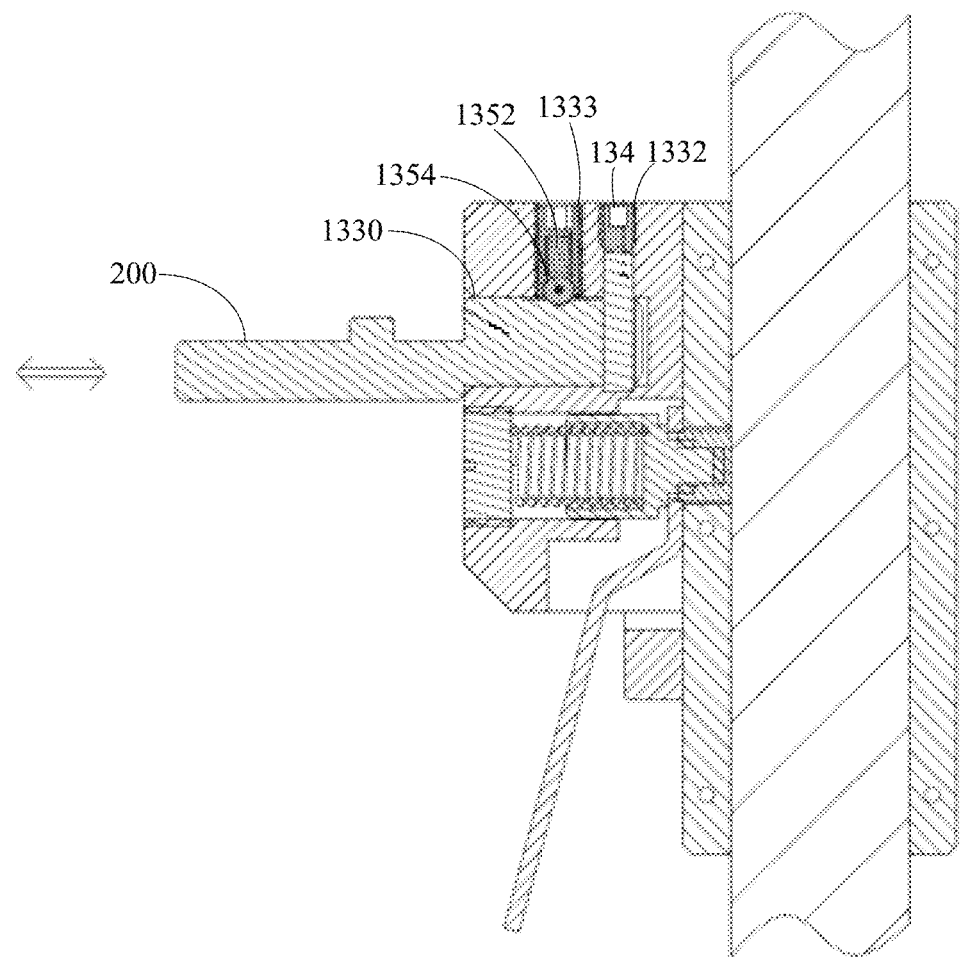
FIG. 11 is a schematic assembly diagram of a sliding assembly and an upright rod of the bracket apparatus shown in FIG. 1, where a fixed axle of the calibration apparatus is inserted into the sliding assembly.

Referring to FIG. 11, when the fixed axle 200 is inserted into the axle hole 1330, the dowel 134 is inserted into the first accommodation hole 1332 and then runs through the installation hole of the fixed axle 200 and one end of the dowel 134 running through the installation hole of the fixed axle 200 is fixed on the inner wall of the axle hole 1330. The strengthening member 135 is inserted into the second accommodation hole 1333 and the second elastic member 1352 pushes the glass bead 1354 to abut against the fixed axle 200 to prevent the fixed axle 200 from shaking.

It can be understood that, in some other embodiments, the strengthening member 135 may be omitted. The second elastic member 1352 may be a spring piece or the like as long as an elastic restoring force can be provided to push the glass bead 1354 to abut against the fixed axle 200.

Figure 12:
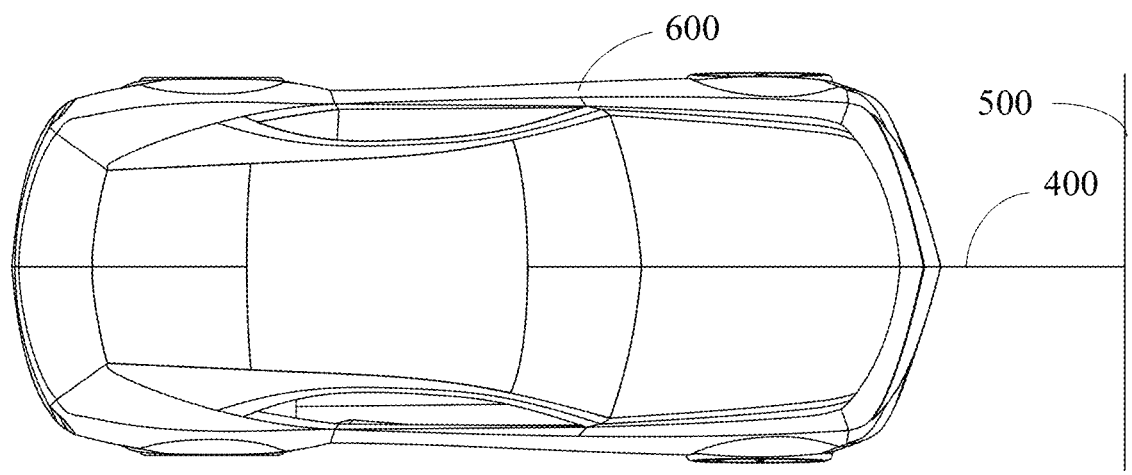
FIG. 12 is a schematic diagram of a projection center line of a vehicle body center line calibrated for a to-be-calibrated automobile and a correction distance equidistant line perpendicular to the projection center line.

Referring to FIG. 3, FIG. 12 and FIG. 13 together, when a to-be-calibrated automobile 600 is calibrated by using the laser angle reflection apparatus 300 carried by the bracket apparatus 100 according to this embodiment, first a vehicle body center line of the to-be-calibrated automobile 600 is calibrated, a projection center line 400 of the to-be-calibrated automobile 600 is marked on the ground and a correction distance equidistant line 500 perpendicular to the projection center line 400 is drawn according to a vehicle calibration requirement.

Then, the laser angle reflection apparatus 300 is made to face a vehicle head of the to-be-calibrated automobile 600 and the first correcting line 1105 and the second correcting line 1106 of the pedestal body 110 are made to coincide with the equidistant line 500. The left and right positions of the pedestal body 110 are adjusted, so that the third correcting line 1107 coincides with the projection center line 400.

Figure 14:
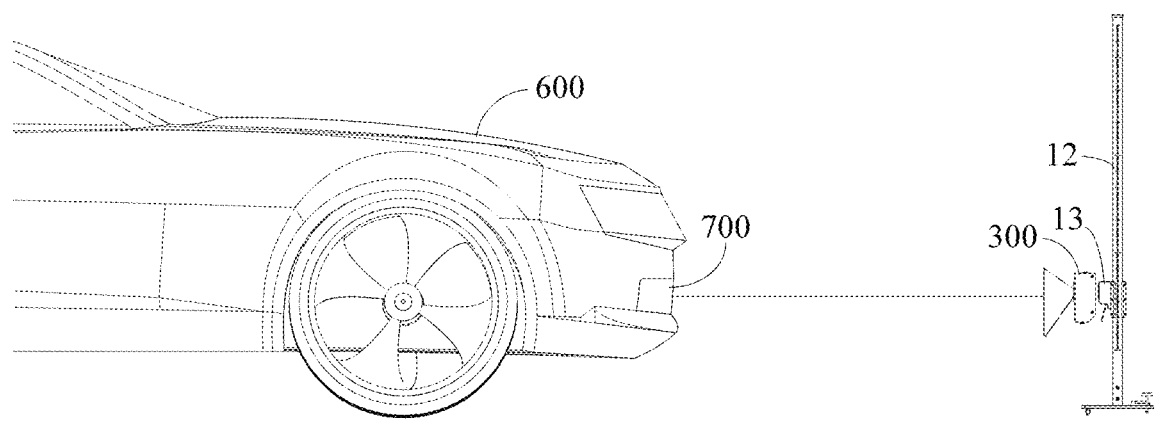

Referring to FIG. 3 and FIG. 14 together, the laser angle reflection apparatus 300 is made to emit a laser and the sliding assembly 13 is slidden to adjust a height of the laser angle reflection apparatus 300, until a laser point can roughly illuminate a center of a vehicle-mounted radar 700. That is, an initial alignment of the laser angle reflection apparatus 300 and the vehicle-mounted radar 700 is completed. The first correcting line 1105 and the second correcting line 1106 are kept to coincide with the equidistant line 500 and the third correcting line 1107 coincides with the projection center line 400. The horizontal adjusting member 113 of the pedestal body 110 is adjusted, so that bubbles of the first horizontal bead 1140 and the second horizontal bead 1142 are located in center positions. At the same time, a position of the laser point on the vehicle-mounted radar 700 needs to be noticed and a height and horizontal position of the laser angle reflection apparatus 300 needs to be adjusted until the bubbles of the first horizontal bead 1140 and the second horizontal bead 1142 are located at the centers of the horizontal beads and the laser point also illuminates the center of the vehicle-mounted radar 700. At this point, a precise alignment of the laser angle reflection apparatus 300 and the vehicle-mounted radar 700 is completed. In this case, the laser angle reflection apparatus 300 may be used to reflect radar waves transmitted by the vehicle-mounted radar 700 to calibrate an installation position and an installation angle of the vehicle-mounted radar 700.

Figure 15:
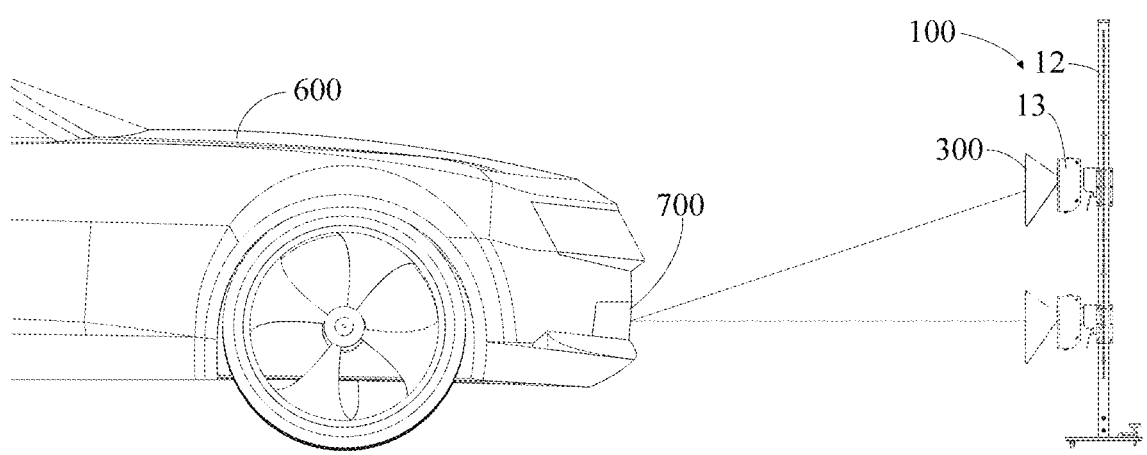

Referring to FIG. 15, according to an actual calibration requirement, while the bracket apparatus 100 is kept motionless, the height of the laser reflector apparatus 300 on the bracket apparatus 100 may be adjusted to reflect radar waves transmitted by the vehicle-mounted radar at different heights, so as to calibrate the installation position and the installation angle of the vehicle-mounted radar.

In this embodiment, the locking assembly 132 can push the anti-skid member 131 to abut against the upright rod 12, so that the sliding assembly 13 is fixed on the upright rod 12, and the sliding assembly 13 can be prevented from going into a free fall to break the sliding assembly 13. At the same time, the locking assembly 132 can push the anti-skid member 131 out of the upright rod 12, so that the sliding assembly 13 can slide freely along the upright rod 12. A height of the calibration apparatus carried by the sliding assembly 13 can be adjusted according to requirements and different height requirements can be satisfied to meet a calibration requirement.

In addition, the dowel 134 is adopted to run through the installation hole of the fixed axle 200 and one end of the dowel 134 running through the installation hole of the fixed axle 200 is fixed on the inner wall of the axle hole 1330, so that the calibration apparatus can be installed on the holding member 133 conveniently and efficiently.

Finally, the pedestal body 110 is provided with the third correcting line 1107, which can facilitate a correction of the bracket apparatus 100 and the projection center line 400 of the vehicle body center line on the ground. The pedestal body 110 is provided with at least one of the first correcting line 1105 and the second correcting line 1106, which can facilitate a correction of the bracket apparatus 100 and the equidistant line 500, thereby preparing for a precise calibration operation to be performed by the calibration apparatus carried by the bracket apparatus 100. At the same time, an axle wire of the axle hole 1330 is parallel to the third correcting line 1107, the axle wire of the axle hole 1330 and the third correcting line 1107 being located at a same vertical plane. When the third correcting line 1107 is corrected with the projection center line 400, the calibration apparatus can be corrected with the center line of the to-be-calibrated automobile 600 conveniently. For example, the laser angle reflection apparatus 300 is corrected with the center line of the to-be-calibrated automobile 600.

Finally, it should be noted that, the foregoing embodiments are merely used for describing rather than limiting the technical solutions of the present invention. According to the idea of the present invention, technical features in the foregoing embodiments or in different embodiments may also be combined. Steps may be implemented in any order and there exist many other changes on different aspects of the present invention described above. For brevity, the changes are not provided in detail. Although the present invention is described in detail according to the foregoing embodiments, a person of ordinary skill in the art should understand that modifications may be made to the technical solutions recorded in the foregoing embodiments or equivalent replacements may be made to some of the technical features therein. These modifications or replacements do not cause the essence of the corresponding technical solutions to depart from the scope of the technical solutions of the embodiments of the present invention.

What is claimed is:

1. A bracket apparatus, comprising a pedestal, an upright rod and a sliding assembly, wherein
    the pedestal supports the upright rod;
    the upright rod is disposed vertically with one end installed on the pedestal; and
    the sliding assembly comprises a clamping member, an anti-skid member, a locking assembly and a holding member, wherein
    the clamping member is installed on the upright rod and the clamping member is capable of sliding along the upright rod;
    the anti-skid member is installed on the clamping member;
    the locking assembly is connected to the anti-skid member, the locking assembly is configured to push the anti-skid member to abut against the upright rod, so that the clamping member is fixed on the upright rod, and the locking assembly is further configured to drive the anti-skid member out of the upright rod, so that the clamping member is capable of sliding along the upright rod; and
    the holding member is installed on the clamping member and is configured to carry a required calibration apparatus.

2. The bracket apparatus according to claim 1, wherein the locking assembly comprises a handle, a pushing block, a first elastic member and a compressing member, wherein
    the pushing block runs through the handle and the pushing block is connected to the anti-skid member;
    the first elastic member is compressed between the pushing block and the compressing member and the first elastic member is configured to provide an elastic restoring force to push the pushing block and the anti-skid member, so that the anti-skid member abuts against the upright rod; and
    the handle is configured to push the pushing block away from the clamping member, to drive the anti-skid member out of the upright rod.

3. The bracket apparatus according to claim 2, wherein the anti-skid member is provided with a first accommodation groove;
    the pushing block comprises a pushing block body and a connection bump, the connection bump being connected to the pushing block body and the connection bump being inserted into the first accommodation groove; and the handle is sheathed on the connection bump, the handle is disposed between the pushing block body and the anti-skid member and the handle abuts against the clamping member.

4. The bracket apparatus according to claim 3, wherein the handle comprises a pressing portion a connection portion and an installation portion, wherein the installation portion is provided with an installation through hole, the connection bump runs through the installation through hole, the installation portion is disposed between the pushing block body and the anti-skid member and the installation portion abuts against the clamping member; and the connection portion is connected between the pressing portion and the installation portion.

5. The bracket apparatus according to claim 4, wherein an angle between the connection portion and the pressing portion is an obtuse angle and an angle between the connection portion and the installation portion is an obtuse angle.

6. The bracket apparatus according to claim 4, wherein the anti-skid member comprises a body portion and a tightening bump, wherein the tightening bump is connected to the body portion and the tightening bump is configured to abut against the upright rod.

7. The bracket apparatus according to claim 1, wherein the locking assembly comprises a handle a pushing block and a first elastic member, wherein the pushing block runs through the handle and the pushing block is connected to the anti-skid member;

the first elastic member is compressed between the pushing block and the holding member and the first elastic member is configured to provide an elastic restoring force to push the pushing block and the anti-skid member, so that the anti-skid member abuts against the upright rod; and the handle is configured to push the pushing block away from the clamping member, to drive the anti-skid member out of the upright rod.

8. The bracket apparatus according to claim 1, wherein the holding member is provided with an axle hole, configured to accommodate a fixed axle of the calibration apparatus.

9. The bracket apparatus according to claim 8, wherein the holding member is provided with a first accommodation hole, the first accommodation hole being communicated with the axle hole; and the sliding assembly comprises a dowel, the dowel being inserted into the first accommodation hole and being configured to fix the fixed axle of the calibration apparatus.

10. The bracket apparatus according to claim 9, wherein the dowel is inserted into the first accommodation hole and then runs through the axle hole and one end of the dowel running through the axle hole is fixed on an inner wall of the axle hole.

11. The bracket apparatus according to claim 8, wherein the holding member is provided with a second accommodation hole, the second accommodation hole being communicated with the axle hole; and the sliding assembly comprises a strengthening member, the strengthening member comprising a strengthening member body, a second elastic member and a glass bead, wherein the second elastic member is accommodated in the strengthening member body, one end of the second elastic member is fixedly installed on the strengthening member body and the other end is fixedly installed on the glass bead; and the glass bead is configured to abut against the fixed axle of the calibration apparatus.

12. The bracket apparatus according to claim 1, wherein the holding member is provided with an accommodation cavity, the accommodation cavity being configured to accommodate the locking assembly.

13. The bracket apparatus according to claim 1, wherein the clamping member comprises a connection board, a first clamping board and a second clamping board, wherein the connection board is connected between the first clamping board and the second clamping board, which are located at two opposite sides of the upright rod respectively; and an accommodation channel is formed among the connection board, the first clamping board and the second clamping board, the accommodation channel accommodating the upright rod.

14. The bracket apparatus according to claim 1, wherein the pedestal comprises a pedestal body, a horizontal adjusting member and a gradienter, wherein one end of the upright rod is fixedly installed on the pedestal body;

the horizontal adjusting member is installed on the pedestal body and is configured to adjust a horizontal angle of the pedestal body; and the gradienter is installed on the pedestal body and is configured to detect whether the pedestal body is disposed horizontally.

15. The bracket apparatus according to claim 14, wherein the pedestal comprises a supporting member, one end of the supporting member being fixedly installed on a lower surface of the pedestal body and a quantity of the supporting members being at least one, wherein one intersection point formed by one supporting member intersecting the lower surface and two intersection points formed by two horizontal adjusting members intersecting the lower surface respectively are located at three vertices of an isosceles triangle respectively.

16. The bracket apparatus according to claim 14, wherein a quantity of the supporting members is three, the three supporting members being arranged neatly along a first straight line; and two horizontal adjusting members are arranged neatly along a second straight line, the first straight line being parallel to the second straight line.

17. The bracket apparatus according to claim 14, wherein the horizontal adjusting member comprises a hand lever and a threaded rod portion, wherein the hand lever is fixedly installed on one end of the threaded rod portion and the hand lever is located above the pedestal body and is configured to facilitate rotation of the horizontal adjusting member; and the threaded rod portion runs through the pedestal body, the threaded rod portion is in screw-thread fit with the pedestal body and the threaded rod portion is disposed vertically.

18. The bracket apparatus according to claim 14, wherein a quantity of the horizontal adjusting members is at least three, wherein three horizontal adjusting members intersect the lower surface of the pedestal body to form three intersection points, the three intersection points being located at three vertices of an isosceles triangle respectively.

19. The bracket apparatus according to claim 14, wherein the gradienter is installed on an upper surface of the pedestal body and the gradienter comprises a first horizontal bead and a second horizontal bead, the first horizontal bead and the second horizontal bead (1142) being perpendicular to each other.

20. The bracket apparatus according to claim 14, wherein the upper surface of the pedestal body is provided with a first correcting line, a second correcting line and a third correcting line, wherein
    the first correcting line and the second correcting line are located at a same straight line; and
    the third correcting line is perpendicular to the first correcting line and the second correcting line and a straight line at which the third correcting line is located passes through an intersection point of the upright rod and the pedestal body.

\* \* \* \* \*